United States Patent

[11] 3,610,577

| [72] | Inventor | Joseph E. Foster, Jr. |
| | | 723 Lincoln Hwy., Exton, Pa. 19341 |
| [21] | Appl. No. | 797,016 |
| [22] | Filed | Feb. 6, 1969 |
| [45] | Patented | Oct. 5, 1971 |

[54] SUCTION FEED CONVEYOR
2 Claims, 5 Drawing Figs.

[52] U.S. Cl. .................................................. 271/30
[51] Int. Cl. ................................................. B65h 3/12
[50] Field of Search ........................................ 271/30, 31, 26, 28, 62; 162/367

[56] References Cited
UNITED STATES PATENTS

| 491,717 | 2/1893 | Parker et al. .................. | 162/367 X |
| 1,876,399 | 9/1932 | Catala et al. .................. | 162/367 |
| 2,240,818 | 5/1941 | Wale ............................. | 271/26 |
| 2,707,142 | 4/1955 | Waite ........................... | 271/62 |
| 2,960,805 | 11/1960 | Herman et al. ................ | 271/62 X |
| 3,490,764 | 1/1970 | Muller et al. .................. | 271/74 |

FOREIGN PATENTS

| 743,449 | 9/1966 | Canada ......................... | 271/32 |

Primary Examiner—Joseph Wegbreit
Attorney—Karl L. Spivak

ABSTRACT: A suction feed conveyor for feeding cardboard blanks including an automatically elevating platform which is vertically operative below a suction conveyor, the said conveyor including suction forces which are strong enough to lift the top sheet from a stack of blank cardboard sheets positioned upon the said elevating platform and conveyor means capable of transversely transporting respectively each said top sheet with respect to the initial platform position.

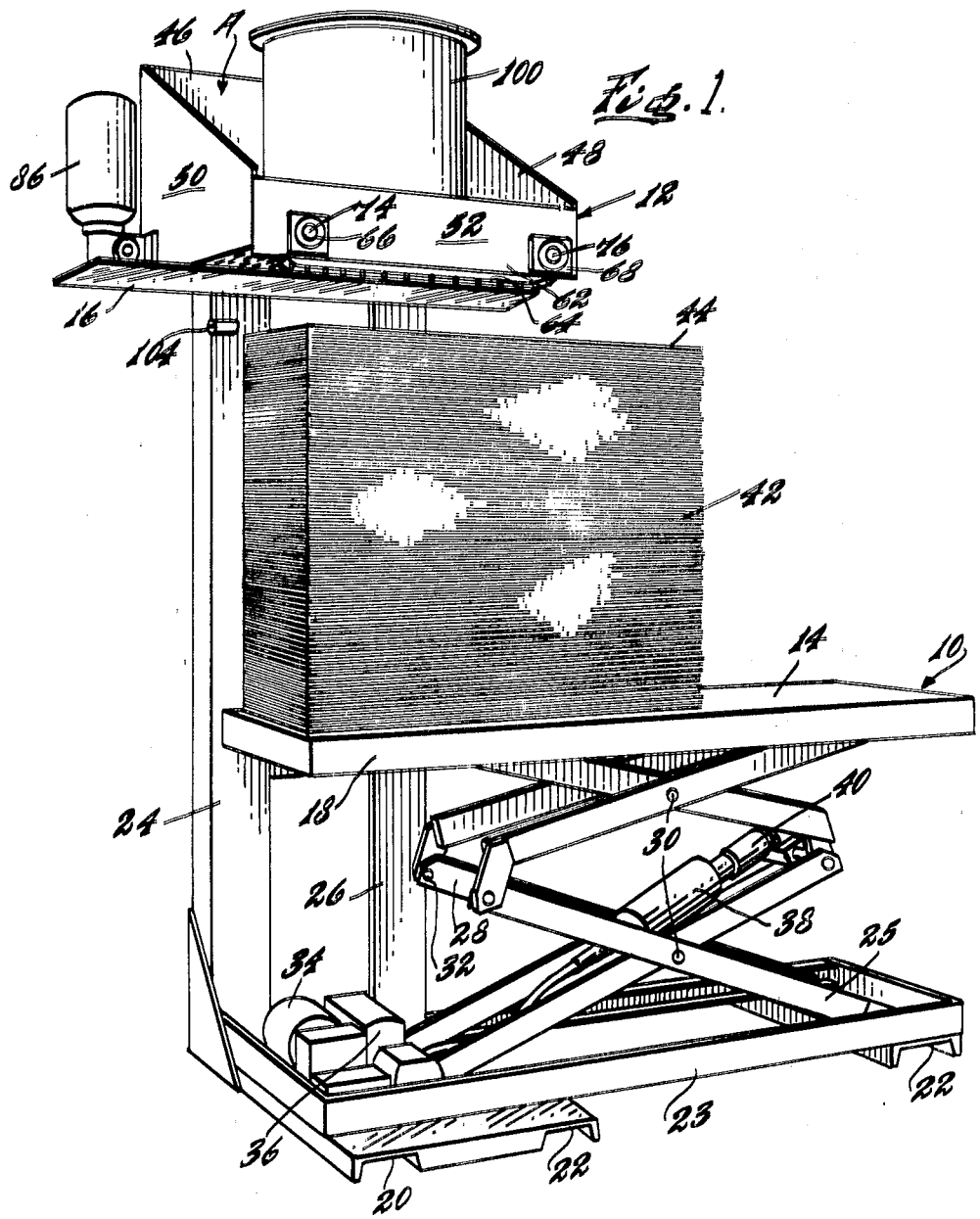

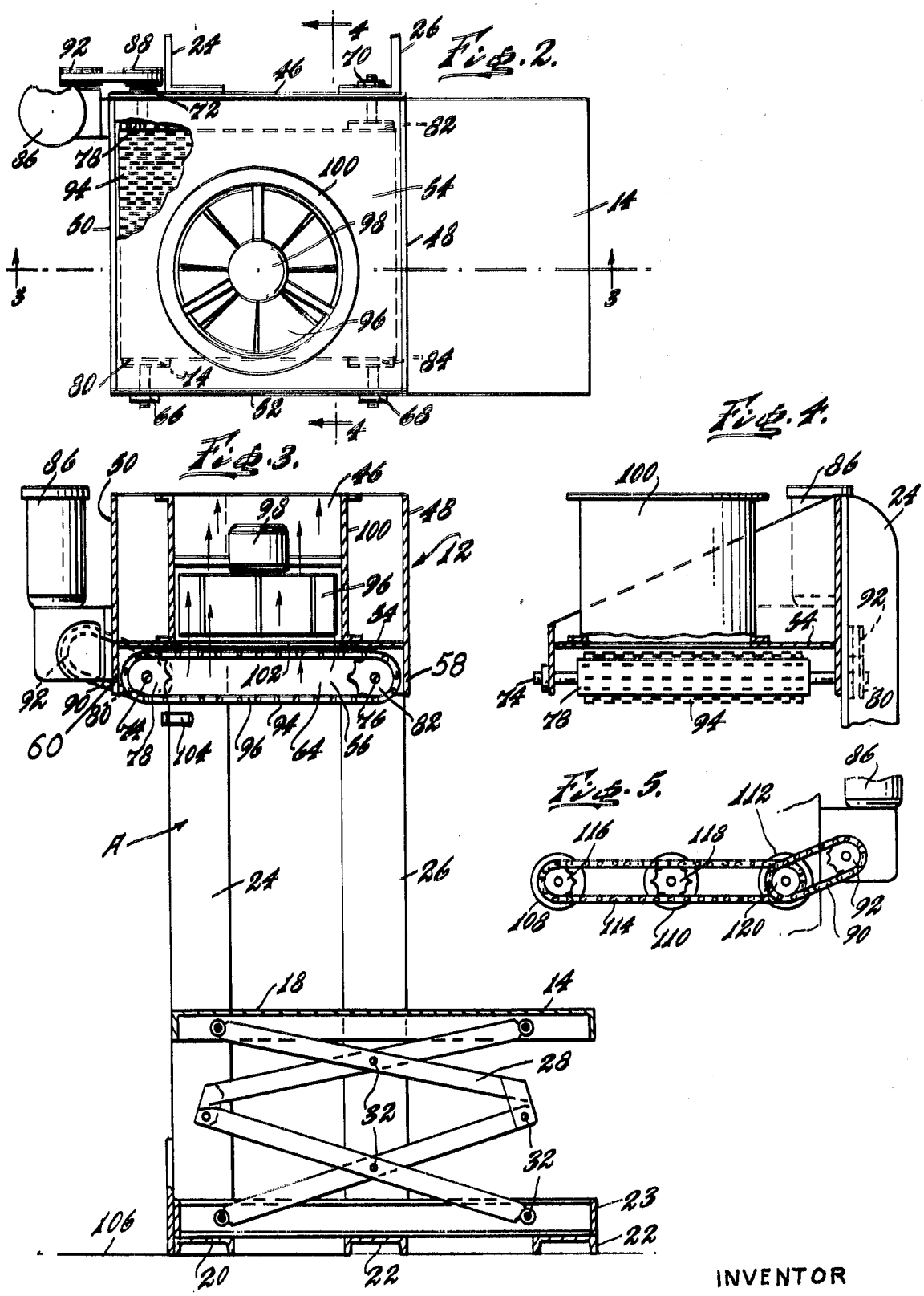

SUCTION FEED CONVEYOR

The present invention relates in general to the heavy paper industry, more particularly is directed to a device capable of transporting heavy cardboard sheets one at a time to the feed nip rollers of any paper process machinery.

At the present time, workers in the heavy paper field have been searching for a reliable and inexpensive method of feeding relatively large cardboard sheets one at a time into the feed nip rollers of various paper process machines such as die cutters, stripping machines, printing machines and folding machines. Prior workers in the field have attempted to solve the problem by providing semiautomatic equipment such as machines including inclined planes to feed the sheets by gravity to the feed nip rollers of the desired operating equipment. Others have attempted to solve the problem by providing conveyors of one type or another and which include means to separate the sheets prior to introducing to the feed nip rollers of the process machine. These prior art machines have generally proved unsatisfactory. in use in that no positive method has heretofore been found whereby only a single sheet is positively transported at one time. Further, the prior art machines could not be designed to be universally adaptable with all types of sheet process machinery, and consequently, all required some type of more or less complicated set up procedures in an attempt to adapt the sheet feed equipment to the process machinery.

All of the prior art attempts to solve the problem have proved to be costly, cumbersome and generally unsatisfactory for the purpose. As a result of the failure of prior workers in the field to produce a satisfactory, automatic device, most single sheet feed operations to cardboard process machinery are now performed by hand. That is, paper workers manually introduce one cardboard sheet at a time into the cardboard process machinery to thereby assure a steady, even flow without elaborate set up procedures. Such manual operations, of course, result in unusually high costs of feeding cardboard sheets over extended periods of time. Further, the present practice is subject to the variations of manual work such as fatigue, illness, labor strife and similar contingencies.

The present invention therefore seeks to overcome all of the difficulties experienced by prior workers in the field and also discloses an apparatus and process whereby substantially all of the manual operations previously required can now be completely eliminated.

Accordingly, it is an object of the present invention to provide an improved cardboard blank suction feed conveyor of the type set forth.

It is another object of the present invention to provide a novel suction feed conveyor that includes an automatically elevating platform which is vertically operative below suction feed means.

It is another object of the present invention to provide a novel suction feed cardboard conveyor which includes a suction conveyor and high capacity suction forces.

It is another object of the present invention to provide a novel suction feed cardboard conveyor having an elevating platform vertically operative below a suction conveyor and including automatic sensing means capable of elevating the platform to the area of influence of the suction means.

It is another object of the present invention to provide a novel suction feed cardboard conveyor including an automatically elevated platform and suction means capable of lifting cardboard blanks one at a time and transversely transporting them with respect to the said platform.

It is another object of the present invention to provide a novel suction feed cardboard conveyor including a suction feed conveyor, cardboard blank sheet attracting suction forces and automatically elevating platform designed to transport blank cardboard sheets into the vicinity of the said suction forces.

It is another object of the present invention to provide a novel suction feed cardboard conveyor that is capable of generating strong suction forces and which includes automatically elevated platform means to introduce the cardboard blanks into the area of influence of the said suction forces.

It is another object of the present invention to provide a novel suction feed cardboard conveyor that is simple in design, rugged in construction and trouble-free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

FIG. 1 is a front perspective view of the invention.

FIG. 2 is a top plan view thereof, partially broken away to expose the conveyor linkage.

FIG. 3 is a cross-sectional view, taken along line 3—3 of FIG. 2, looking the direction of the arrows.

FIG. 4 is a cross-sectional view, taken along line 4—4 of FIG. 2, looking in the direction of the arrows.

Although specific terms are used in the following description for the sake of clarity, these terms are intended to refer only to the particular structure of my invention selected for illustration in the drawings and are not intended to define or limit the scope of the invention.

Referring now to the drawings, I show in FIG. 1 a suction feed conveyor generally designated A comprising in combination a scissor lift 10 and a conveyor section 12. The scissor lift 10 vertically reciprocates below the conveyor section 12 and vertically moves the platform 14 with respect thereto. As best seen in FIGS. 1 and 3, the conveyor section 12 positions generally over the left-hand side of the scissor lift platform 14 and functions to transport cardboard blank sheets 16 transversely with respect to the left half 18 of the platform 14. An L-shaped structural steel-supporting frame comprising a plurality of short horizontal structural members 20, 22, 22' and interconnecting vertical members 24, 26 carries the scissor lift section 10 and the conveyor section 12 in sturdy operating relation to each other.

The scissor lift section 10 includes generally a horizontal platform 14 which vertically reciprocates above the base 23 by means of the pivotally interconnected elevating arms 25, 28 which operate about the plurality of right and left pivot pins 30, 32 in the usual manner. An electric motor 34 drives the hydraulic pump 36 which in turn powers the hydraulic cylinder 38 to elevate and lower the platform 14 by the action of the hydraulic plunger 40 upon the elevating arms 25, 28 in well-known manner. The platform 14, carries a stack 42 of cardboard blanks and elevates the top 44 of the stack into the vicinity of the conveyor section 12 by means of an electric eye control 104 hereinafter more fully set forth.

Referring now to FIGS. 2, 3 and 4, the conveyor section 12 includes a backplate 46 which secures to the upper portions of the vertical structural members 24, 26 in well-known manner such as by welding or riveting. The conveyor section sideplates 48, 50 horizontally extend forwardly from the backplate 46 and forwardly carry the front plate 52 to form an enclosure of generally rectangular configuration. A fan plate 54 horizontally mounts within the plates 46, 48, 50, 52 approximately 4 inches above the bottom thereof. It should be noted that the bottom extensions 56, 58, 60, 62 of the plates 46, 48, 50, 52 below the fan plate 54, define the peripheral configuration of the bottom suction plenum 64 as hereinafter more fully set forth.

The back and front plates 46, 52 are respectively drilled near the transverse edges thereof below the fan plate 54 connection to carry the conveyor shaft bearings 66, 68, 70, 72. The conveyor shafts 74, 76 horizontally rotate within the respective bearings 66, 72 and 68, 70 and outwardly respectively carry the conveyor belt sprockets 78, 80 and 82, 84. As best seen in FIG. 2, an electric motor 86 secures to the sideplate 50 and powers the driving shaft 74 by means of the shaft affixed pulley 88. The belt 90 drives the pulley 88 to convey power from the driving pulley 92 in well-known manner.

A conveyor belt 94 of the open chain, endless belt type transversely rotates about the conveyor shafts 74, 76 upon the driving belt sprockets 78, 80 and the driven belt sprockets 82, 84. As best observed in FIG. 3, the conveyor belt 94 rotates generally in the suction plenum area 64 which is defined by the bottom extensions 56, 58, 60 and 62 of the interconnected plates 46, 48, 50 and 52. It should be noted that the lowermost horizontal portion 96 of the belt 94 extends below the bottom of the plenum area 64 to thereby permit transporting the individual cardboard blanks 16 without interference by the bottom extensions 56, 60, 58, 62 as hereinafter more fully set forth. A suction fan 96 of the vanaxial type having an axially aligned motor 98 supports within a cylindrical frame in well-known manner and mounts upon the fan plate 54 which has a circular opening 102 provided therein in alignment with the axis of the fan 96 to thereby permit suction air from the plenum 64 to be exhausted upwardly through the suction fan. The suction fan 96 must be powerful enough to pull a vacuum in the suction plenum 64 by drawing air upwardly through the conveyor belt 94 to thereby create suction forces beneath the conveyor section 12 to thus attract a sheet 16 from the top 44 of the stack of cardboard blanks 42, It should be noted that the chain link construction of the conveyor belt 94 readily permits the passage of suction air forces from the suction plenum 64 through the exhaust fan 96.

As an alternate means of construction, a plurality of horizontally juxtaposed rollers 108, 110, 112 may be utilized for cardboard blank transport purposes in lieu of the conveyor belt 94 as shown in FIG. 5. A plurality of shaft connected sprockets 116, 118, 120 respectively rotatively drive the rollers 108, 110, 112 by means of a chain drive 114 which is powered by the motor 86 in the usual manner.

An electric eye device 104 mounts upon one of the structural supports such as the vertical structural member 24 beneath the conveyor section 12 and sights the top 44 of the cardboard stack of blanks 42 in the usual manner. The electric eye 104 is wired to control the electric motor 34 that powers the scissor lift 10 to elevate the platform 14 in small increments. The electric eye 104 and the electric motor 34 are so controlled that the motor will function the hydraulic pump 36 and the hydraulic cylinder 38 to continually elevate the platform 14 so that the top of the cardboard stack 42 positions within the sphere of influence of the suction forces created by the suction fan 96 operating through the suction plenum 64. In this manner, the forces created by the suction fan 96 attract the top sheet 16 from the cardboard stack 42 and pull it into suctional engagement with the bottom of the conveyor belt 94, or optionally, with the rollers 108, 110, 112. The motor 86 drives the conveyor belt, or optionally, the rollers, to thereby transversely transport the sheet 16 as best seen in FIG. 1.

In order to operate the invention, the platform 14 of the scissor lift 10 is first deelevated in well-known manner using the usual machine controls (not shown) until the platform lowers as close to the floor 106 as the scissor lift construction permits. A pile of cardboard blanks 42 is then placed upon the platform 14 and is positioned upon the left half 18 thereof to underlie the conveyor section 12. The usual forklift type of truck or other well-known load transporting means may by utilized to so pile the blanks. The platform 10 is then elevated utilizing the machine controls (not shown) in well-known manner until the top 44 of the pile approaches the electric eye 104. As hereinabove mentioned, the electric eye 104 positions on a structural member such as the vertical support 24 and controls the scissor lift power components to thereby carry the top 44 of the cardboard pile 42 close enough to the bottom of the conveyor belt 44 so that the top sheet 16 is carried upwardly by the suction forces created by the suction fan 96 to thereby removably attach to the bottom of the conveyor belt 94. The conveyor motor 86 drives the conveyor belt 94 or the rollers 108, 110, 112 which thereby suctionally, laterally move the blank sheets 16 individually to the feed nip rollers (not shown) of the paper process machinery being loaded by the present invention. It should be noted that the blank sheet 16 substantially overlies the suction plenum 64 and thereby acts to block suction forces from attracting the next sheet from the top of the pile 42. As soon as the blank 16 clears the conveyor belt 94, sufficient suction forces from the suction fan 96 are again available to attract the top sheet into suctional engagement with the conveyor belt, thereby repeating the process. The electric eye control 104 functions to elevate the platform 14 in response to the successive removal of the blank sheets 16 from the top 44 of the cardboard blank pile 42 until all of the blank sheets are subsequently attracted to the conveyor belt and transported by the conveyor means in accordance with the present invention.

Although I have described my invention with a certain degree of particularly, it is understood that the present disclosure has been made by way of example and that numerous changes in the details of construction and the combination and arrangement of parts may be restored to without departing from the scope and spirit of the invention as hereinafter claimed.

What is claimed is:

1. In a suction feed conveyor for successively attracting and transporting the top sheet from a pile of sheets, the combination of
    A. lift means vertically lifting the said pile of sheets,
        1. said lift means including a pile-supporting platform,
        2. power means to vertically position the said platform in response to a control system;
    B. conveyor sections means positioned in partial vertical registry above the platform;
        1. said conveyor section means including a horizontal fan plate enclosed within vertical sideplates,
            a. portions of the sideplates extending below the fan plate and downwardly terminating in a horizontal plane, to form a suction plenum,
        2. an endless conveyor belt of open chain link construction revolving within the suction plenum,
            a. the bottom of the belt lying in a horizontal plane spaced slightly below the plane of the bottom of the sideplates,
        3. fan means mounted above the fan plate and pulling its suction air directly through the conveyor belt to apply fan suction forces at the said bottom of the belt,
            1. the fan suction forces in turn attracting the top said sheet from the pile of sheets and holding it against the bottom of the belt initially in substantial registry with the suction plenum to prevent the attraction of fan suction forces from reaching the pile,
            2. each said top sheet partially shielding the said pile from fan suction forces as it in turn is transported across the conveyor section means,
            3. each said top sheet sufficiently shielding the pile to prevent fan suction attraction of the next exposed top sheet until the sheet being transported is carried past the suction plenum whereupon the said next exposed top sheet is attracted to the bottom of the belt for transport purposes; and
    c. electric eye sensing means sighting the top of the said pile,
        1. said sensing means being responsive to the absence of the top sheet being transported by the conveyor, and said sensing means then activating said control system intermittently to urge the platform into position to elevate the next exposed top sheet into the sphere of attraction of the fan suction forces.

2. The invention of claim 11 wherein the centerline of the said lift means is horizontally juxtaposed from the centerline of the said conveyor means.